(12) United States Patent
Casati et al.

(10) Patent No.: US 11,778,357 B2
(45) Date of Patent: Oct. 3, 2023

(54) SOUND DIRECTING DEVICE FOR A MOBILE TELECOMMUNICATION DEVICE

(71) Applicants: Nicolas Casati, Chicago, IL (US); Francois Casati, Pfaffikon (CH)

(72) Inventors: Nicolas Casati, Chicago, IL (US); Francois Casati, Pfaffikon (CH)

(*) Notice: Subject to any disclaimer, the term of this patent is extended or adjusted under 35 U.S.C. 154(b) by 0 days.

(21) Appl. No.: 16/038,403

(22) Filed: Jul. 18, 2018

(65) Prior Publication Data

US 2020/0029144 A1    Jan. 23, 2020

(51) Int. Cl.
*H04R 1/08* (2006.01)
*H04R 1/34* (2006.01)
*H04M 1/19* (2006.01)

(52) U.S. Cl.
CPC .............. *H04R 1/083* (2013.01); *H04M 1/19* (2013.01); *H04R 1/342* (2013.01)

(58) Field of Classification Search
CPC .. H04R 1/08; H04R 1/34; H04M 1/19; H04M 1/05; H04M 1/6041; H04M 1/6058
USPC .................... 379/441, 444, 447; 455/575.6
See application file for complete search history.

(56) References Cited

U.S. PATENT DOCUMENTS

| | | | | |
|---|---|---|---|---|
| 3,796,842 A | * | 3/1974 | Guille | H04R 1/083 381/367 |
| 4,072,831 A | * | 2/1978 | Joscelyn | H04R 1/083 381/344 |
| 7,493,899 B2 | * | 2/2009 | Davies | A62B 18/08 128/201.19 |
| 2009/0060169 A1 | * | 3/2009 | Manne | H04M 1/05 379/430 |

* cited by examiner

*Primary Examiner* — Melur Ramakrishnaiah

(57) ABSTRACT

The present invention employs a privacy mask, with elongated mouth-piece, having a semi-circular opening for a user's mouth and a second opening coupled with a transfer tube in which a user's voice travels until it reaches the receiver of a mobile phone or computer, inserted in a head-set equipped with ear-pieces. The present invention is a telecommunication device allowing both speaking and listening with privacy, since it prevents both the user's voice to spread in the surrounding and outside noises to disturb the communication.

17 Claims, 8 Drawing Sheets

SOUND DIRECTING DEVICE FOR A MOBILE TELECOMMUNICATION DEVICE

INTRODUCTION

With the multiplication of mobile devices, either in open-space, working offices, public locations, or the like, an effective sound-directing device will minimize voice disturbance and provide privacy to the user. Such a sound-directing device is easy to transport and utilize while preserving the quality of sound reaching the receiver of a communication device.

BACKGROUND

According to F. Alton Everest (The Master Handbook of Acoustics, Tab books, 1989), speech sound is highly variable and transient in nature, comprising energy chasing up and down the three-dimensional scales of frequency, sound level and time. There are three different sources of sound to be shaped by the vocal tract. First, the sounds are emitted by the vocal cords produced by air from the lungs passing the slit between the vocal cords (the glottis), which cause the cords to vibrate (vocal cord vibration). Second, sound is created by forming a constriction at some point in the vocal tract with teeth, tongue, or lips thereby forcing air through the constriction under high enough pressure to produce significant turbulence (construction turbulence). Finally, sound is created by the complete stoppage of the breath, toward the front, a building up of the pressure, and then the sudden release of the breath (plosive).

These three parameters of speech (vocal cord vibration, construction turbulence and plosive) show that a proper sound voice reducing device for phone users should not hinder the movement of the mouth, especially tongue, jaw and lips, as well as the speaker's ability to breath. In addition, such a device should not create air turbulences, echoes, interferences and/or resonances, potentially disturbing for the phone call listener.

Sound is transmitted by air as waves. The sound intensity is proportional to the square of the sound pressure. The intensity of conversational speech, being measured as a sound pressure, is about 0.02 Pa or 60 decibels. As a comparison, the engine of a heavy truck is at about 100 decibels and the hearing threshold, or the lower limit of perceptible sound striking the human eardrum, is 10 decibels.

When sound spreads around, the pressure decreases proportionally to distance. In closed quarters, such as buildings, offices, trains, buses or airplanes, noise waves generated by people talking on the phone travels around obstacles and are reflected by walls, windows and seat backs. These sounds waves bother other persons being present close-by. The present invention attempts to minimize the public disturbance by these speakers.

Measurements by Heinrich Kutruff (ref Everest, p. 146-148) have shown that human voice travels differently depending on frequencies. As expected, noise spreads from the mouth in all directions, including the back of the head, albeit to a lower extent. The decrease in voice intensity is constant for all frequencies in the front direction, but it decreases faster for high frequencies (1,400 to 2,000 Hz) in both side and back directions, compared to low frequencies (125-250 Hz). As it is known, male and female voices differ in range of frequencies between 20 and 5,000 Hz. The human ear is sensitive to frequencies between 20 and 20,000 Hz.

Technical solutions to effectiveness are well known for other acoustical applications. For instance, C. Eeckhaut et al, in their article entitled, Improved Sound Insulation in Motor Vehicles (Polyurethanes World Congress 1987-Sep. 29-Oct. 2, 1987 proceedings, p. 708 to 711) state that "a typical automotive acoustical barrier consists of a soft foam (compliant) layer sandwiched between the floor pan of a car and a heavy layer (massback)". Indeed, the airborne loudness generated by the running engine, by the tires in contact with the pavement and by all other parts of the car body vibrating during the automotive displacement at various speeds, can be reduced, using such a compliant-massback sound barrier, to get a noise level inside the passenger compartment of not higher than 70 decibels for an average automotive moving at about 100 km/h. For high-class vehicles these noise levels are reduced to much lower levels. Such sound insulation devices are most effective between frequencies ranging between 300 and 5,000 Hz, hence with frequencies covering those of human voice, albeit not the lowest ones.

For these lower frequencies, the best barrier is the so-called heavy layer, as it is known from acoustical insulation inside buildings. This layer, to be effective for sound barrier, has to be impervious, i.e. allowing no passage of air through it. The higher its weight, the more effective it is to absorb low frequencies. For simple sound reducing devices, object of the present invention, such a sound barrier, without the compliant layer, may be sufficient since these low frequencies are usually the most bothering for third parties.

A single type of sound directing device for phone users, as it is the object of the present invention, can be effective to all human voices and all types of languages, in any type of environment, cold or hot, dry or tropical.

Previous efforts to develop a voice sound directing device are based on a facemask with the phone microphone placed inside the mask or inserted in a tube inside the mask. For instance, JP 2006-340187 (by AKINO) claims a device to reduce wind noise and JP 2000-174875 by Kasashima discloses a mask with a cup-shaped housing and a sound collection microphone.

U.S. Pat. No. 7,783,034 (by MANNNE) combines both the mask and the wind reducing tube to get a communication privacy mask. However, this patent claims a hollow sound tube mounted in the housing. Further, MANNE requires a desired pressure range in the mask between 4 and 8 mmHg (see column 4, lines 43-45). MANNE therefore requires the use of one or more adjustable valve(s) (see column 4, lines 54-55). This is difficult to be put in practice for all phone users since some users tend to speak and breathe more often than others. Additionally, MANNE discloses the use of a tube microphone requiring a foam insert to reduce direct blowing (see column 5, lines 42 to 46).

Masks equipped with a microphone are known. For example, U.S. Pat. No. 4,129,754 discloses a hand-held reporting device for use in environments wherein a minimum of sound in connection with use of the device is a priority and in environments having a high level of noise intensity. The device includes a barrel with a bell-shaped top, where the top is preferably set at an angle with respect to the barrel. A microphone is positioned at the end of the barrel remote from the bell-shaped top. The reporting device includes means for permitting pressurized air within the device to escape via an air communication channel from inside the device through a portion of the face piece of the device to the outside.

A more elaborate device has been disclosed in U.S. Pat. No. 3,796,842. It relates to a dictation mask adaptable for use by a court reporter, which is electrically connected to a recording apparatus for recording the voice of the dictator.

The '842 patent teaches of a generally spherically-shaped member providing an area for fitting on the face of the dictator and including a plurality of chambers serially in communication by means of apertures. Some of the chambers having muffling coils mounted therein for receiving the breath and voice of the dictator and muffling the sound there from. The muffling coil are provided with a plurality of spaced-apart breath exhaust passages, wherein, the spherically-shaped member is provided with a handle and the handle is provided with one of the plurality of chambers.

There is therefore a need for a privacy mask having good sound fidelity, less pressure buildup, which also blocks outside sound from coming in and blocks inside voice from leaking out.

Preservation of voice quality for the listener is important. As already stated, echoes, interferences and/or resonances as well as outside noises, such as traffic engines, bells' ring, other phone users' voices, can be bothering for the person receiving the speaker's message. Another issue could be that the voice level becomes too low due to the use of an improper sound-deadening device. Another reason for reduced voice level could be lack of proper breathing. Human voice can also be altered when the phone user's jaw is not able to move up and down. Finally, it is important to avoid distorting the human voice through inadvertent neutralization of some key frequencies.

The device has a privacy mask, having an inner and outer surface, with the inner surface of the privacy mask lined with a heavy layer or a soft foam layer, or combination thereof. The privacy mask can be lined with a form as a sound absorber, hence avoiding reverberation. The device has a transfer tube, having an inner and outer surface, with the inner surface of the transfer tube being smooth. The privacy mask is connected to the transfer tube in order to carry the voice sound to the phone, microphone, or telephone mouthpiece.

A phone microphone can be placed inside the privacy mask. However, this concept would not function properly since the free volume is too small and the user's voice becomes inaudible for the phone call receiver, using conventional headphones, due to echoes. The solution is to transfer the waves of the voice from the sound-deadening device to the phone microphone or telephone mouthpiece via a transfer tube with an open end for the user's breathing.

There exists a need for a sound directing device for mobile telecommunication, sound transmission, and computer devices, which are safe to use and does not require an adjustable valve. There also exists a need to develop a non-electronic sound-directing device.

It is clear that there is a psychological effect of wearing a mask. However, as it will be explained hereafter, for practical reasons of inducing stress, the privacy mask does not need to cover the nose of the user.

It is contemplated that the privacy mask is made of transparent plastic, such as PE (Polyethylene). The present invention can also provide hands freedom.

It is contemplated that the user of the privacy mask may whisper since the device concentrates the voice sound inside a transfer tube. Finally, the device, object of the present invention, allows the phone user to breathe freely.

It is contemplated the invention directing tube and/or privacy mask is aligned or made with a heavy layer of material along the inner surface. This so-called heavy layer can be made of synthetic materials, such as rubber, silicone polymer, mineral filled polyolefine, PVC (Polyvinyl Chloride), PC (Polycarbonate), TPU (Thermoplastic Polyurethane elastomer), RIM (Reaction Injection Molding), Polyester, Thermoplastic Polyester, Polyethylene, HDPE (High Density Polyethylene), LDPE (Low Density Polyethylene), Fluorinated HDPE, PP (Polypropylene), PS (Polystyrene), PET (Polyethylene Terephthalate), ABS (Acrylo-Butyro Styrene), PA (Polyamide), or natural products such as wood, cardboard or leather. The heavy layer can be rigid, flexible or semi-flexible.

It is further contemplated a compliant acoustical material may be utilized, in addition to a massback within the privacy mask or directing tube along the inner surface to contain and direct high frequency sounds within the device. Well-known compliant acoustical materials are cotton felt or fiber pads. However, preferred option for the present invention is foam, and especially synthetic foam, such as polyurethane foams, conventional, highly resilient, preferably viscoelatic, or Melamine, and more preferably with a percentage of open cells higher than 20 percent, more preferably higher than 50 percent.

The device is worn around the mouth during phone discussions either by direct skin contact or by a close distance of not more than 5 centimeters, more preferably 2 centimeters. Such device can be applied against the cheek skin of the phone user in order to prevent noise leakages.

It is contemplated that to prevent direct contact of the device with user's skin is to have a disposable protective layer and/or film, made of fabric or paper, non woven or felt, installed on its skin contact surface, prior to use. This protective layer can be kept in place with an adhesive or more preferably through mechanical means.

It is contemplated a foam layer may be placed within the inner surface of the device. The foam layer may contain a biocide to prevent microbial growth. This biocide, acting as a fungicide and/or a bactericide, such as, for instance, Aurical 48* (Trademark of Angus), has to be harmless to human. It is added to the foam formulation or impregnated inside the foam. The foam can also be kept out of direct contact with the mouth through the use of a disposable protective layer and/or breathable film that is able to withstand moisture.

It is preferred to have one disposable protective layer or film for the whole device that can be left in place when the phone is not used, in order to protect its surface from outside contamination. The disposable layer can be replaced before each phone use or can be used multiple times. The protective layer or film for the foam does not need to be replaced before each use of the phone. An example of such protective layer is face tissues. This tissue can be pierced in front of the opening pipe, to allow better transmission of the user's voice to the sound receiver.

Acoustic tests with foam covered by a protective skin have shown that noise absorption of low frequencies is increased, while it is reduced at high frequencies, hence it is preferred to have a breathable protective layer.

Volatile Organic Compounds ("VOC"), and obnoxious odors potentially generated by components within the device should be avoided. The foam or foam pads that line the inner walls of the device should have a thickness between 2 and 20 mm and a density between 5 and 150 kg/m$^3$. Foams which are contemplated include poyurethane foams, those foams that do not contain heavy metals, Phthalate plasticizers, Organo tin compounds, TDA (Toluene Diamine), Melamine, such as Basotect, MDA (Methyl Diphényl Amine) and have low Chlorine levels. It is preferred to use a foam that does not contain amine catalysts compounds.

Since it would also be preferable to have foam that does not catch fire too easily, the foam used for the present invention may contain proper polyols and additives, such a PIPA (Polyisocyanate Polyaddition polyols) or PHD (Polyharnstoff or Polyurea) polyols.

To avoid degradation from sunlight and the outdoor elements, it is contemplated the device contains a UV stabilizer or the device is made of disposable components such as cardboard.

All plastics, other than foams, used with the present invention, should be food grade, i.e. able to package or protect food and/or beverages. One example of such plastics is Du Pont Hytrel* TPC-ET, a plasticizer free thermoplatic polyester.

It is further contemplated the foam and mask are made from products not containing products that cause allergies such as Chromium, Nickel, Mercury or Cobalt. In addition, it is contemplated the foam and mask are made from products not containing DBT (Dibutyl) or TBT (Tetrabutyl) those are less than 0.1 milligram per kilogram of foam. TDA (Toluene diamine) or MDA (Methyldiphenylamine) are less than 5 milligrams per kilogram of foam, Phatalate limits that are less than 100 milligrams per kilogram.

The sound-directing device for phone users contemplates the benefit of being ergonomically formed for user's comfort.

It is contemplated the device should not weigh more than 500 grams, more preferably less than 180 grams, and even more preferably less than 150 grams, all together, i.e. the device itself and its holding part. However, in offices, where such sound reducing devices could be placed permanently on the user's desk, a weight of 500 grams is acceptable.

The device does not need to be pressed against the user's face, including the cheeks while he or she is listening to the person at the other end of the line. The device can be either held in position in front of the user's mouth through all possible means including a belt, straps, headband, spectacle arms, etc.

The device can be held by hand in the same way as the phone itself and it can be moved freely while listening. The device can be combined with a phone; hence the user holds both the phone and the sound-deadening device at once. To use the device and a phone at the same time, the user maintains the exit end of the directing tube in a position relative to the phone sound receiver.

It is contemplated the device can be used in conjunction with a mobile or land based telephones, with or without using headphones or earphones. This adjustment is made through the length and the shape of the transfer tube.

The inner surface of the transfer tube should remain smooth. It is further contemplated the masking part and the speaking tube may not be made of the same material, since the masking part may be rigid and the speaking pipe or tube may be flexible.

It is contemplated the opening where a user places his or face at or near the mask is equipped with flexible foam. The cushion covers can be made from PVC or polyethylene film, or the like. The cushion can be removable and washable.

It is contemplated the device preferably does not cover the user's nose. It is also preferable that enough open space is left inside the device to let the phone user's lips open and close, as needed, while he or she speaks. The privacy mask can preferably cover both the user's mouth and his or her chin. The privacy mask can otherwise cover just the user's mouth and not chin. Further, the user's jaw should be able to move inside within the lower part of the mask.

The top edges of the privacy mask of this device can be shaped to adjust to the bottom portion of the user's face. The privacy mask may be equipped with cushions as described heretofore in order to create a closed volume around the phone user's mouth. However, this free volume for the phone user's lips should not be too large in order to avoid resonance. A maximum of free volume, once the mask is in place against the user, should preferably be between 0.05 and 1 liter.

It is contemplated the device can further have a handle attached to the privacy mask, in order tier the user to hold it without fatigue during phone call.

It is contemplated the privacy mask is hyhperbola in shape. The hyhperbola shape allows for a conforming curvature around the facial features of a user while avoiding the nasal region and elongating along the cheek regions.

In the preferred embodiment, the communication privacy device comprises a cup-shaped mask having an inner wall surface, and outer wall surface with an opening end for positioning on a user's face and over the user's mouth and facial-piece; the inner wall surface is lined with a soft foam or heavy material layer, or both; the opening end has a facial piece attached to the housing portion at the affixing edge and a brim covered with flexible foam with a general structure to complement facial groves of the user and a filter; a transfer tube having an open end connected to the mask at the closed end; the transfer tube is connected to the mask through a hole; the hole can be placed in front of the speaker's mouth, or on a side of the mask; the transfer tube, not longer than 100 centimeters, is an elongated tube, rigid or flexible, with an open end, middle section, and exit end, and an inner and outer surface; the inner surface of the transfer tube is smooth; the transfer tube having an open end orientated directly at said user's mouth in said opening; the transfer tube exit end is straight, jagged, or tapered; a sound receiver of an electronic device, being a cellular phone or any recording device, is placed at a close distance having an angle to the exit end, the exit end is round, square, or oval, of the transfer tube; the transfer tube has an inner wall diameter between 0.1 and 2 centimeter; the total weight of the device should be between 50 and 500 grams.

It is further contemplated in the preferred embodiment the privacy mask-housing housing portion is made from PE (Polyethylene), transparent plastic, or synthetic material, such as rubber.

It is further contemplated the transfer tube is bendable, can rotate through a hinge, or an axle located near the supporting earpiece. The transfer tube can also be self supporting.

It is further contemplated in the preferred embodiment, the inner surface of the privacy mask soft foam or heavy material further comprises synthetic materials, such as rubber, silicone polymer, mineral filled polyolefine, PVC (Polyvinyl Chloride), PC (Polycarbonate), TPU (Thermoplastic Polyurethane elastomer), RIM (Reaction Injection Molding), Polyester, Thermoplastic Polyester, Polyethylene, HDPE (High Density Polyethylene), LDPE (Low Density Polyethylene), Fluorinated HDPE, PP (Polypropylene), PS (Polystyrene), PET (Polyethylene Terephthalate), ABS (Acrylo-Butyro-Styrene), PA (Polyamide), Melamine, or natural products such as wood, cardboard or leather, being rigid, flexible or semi-flexible.

It is further contemplated in the preferred embodiment, the exit end of the transfer tube can be open and either be in contact with the sound receiver of an electronic device, placed at a close distance, between 0 and 2 centimeters, preferably between 0.1 and 1 centimeter.

It is further contemplated in the preferred embodiment, the angle between the transfer tube exit and the surface of the sound receiver of electronic device can vary between 30 and 90 degrees, preferably between 45 and 90 degrees held in position by the hand of the user or it can attach to the sound receiver of electronic device using proper means, such as a clip, rubber band, Velcro, sucking device, or the like.

It is further contemplated in the preferred embodiment, the foam or heavy layer does not contain products that cause allergies such as Chromium, Nickel, Mercury or Cobalt are not used in case of leather use, DBT (Dibutyl) or TBT (Tetrabutyl) Tin are less than 0.1 milligram par kilograms of foam, TDA (Toluene diamine) or MDA (Methyldiphenylamine) are less than 5 milligrams per kilogram of foam, Phatalate limits that are less than 100 milligrams per kilogram.

It is further contemplated in the preferred embodiment, the foam has a thickness between 2 and 20 mm and a density between 5 and 150 $kg/m^3$.

It is further contemplated that the privacy mask has a semi-circular mouthpiece to improve the speaking ability of the user with more aesthetic and lower weight, hence better comfort.

It is further contemplated that Polyurethane foam is utilized as interlinear inside the privacy mask or mouthpiece with low emission and better Flame Resistance Melamine foam to improve safety and hygiene of use while preserving voice quality by eliminating resonances.

It is further contemplated that the connection of the privacy mask coupled with a transfer tube to a phone or computer receiver housed near the earpiece of a headset in order to allow both to speak and to listen without interferences or disturbance with the surrounding.

It is contemplated that the sound directing device is connected to a receiver of a head-set equipped with earpieces and linked to a phone or computer to allow both speaking and hearing quietly.

It is contemplated that the privacy mask is an elongated device with a semi-circular top shape mouthpiece covering both lips and linking both cheeks of the user with a free inside volume to allow these lips to open when speaking in order to trap the voice and conduct it to the transfer tube via proper second opening.

It is contemplated that the privacy mask has a length from cheek to cheek below 15 centimeters and at least 5 centimeters to cover the lips of both adults and young users. It is contemplated that the privacy mask or mouthpiece has a semi-circular depth on the speaking side of at least 2 centimeters and not more than 10 centimeters.

It is contemplated that the privacy mask or mouthpiece has a width of at least 3 centimeters and not more than 8 centimeters to cover both lips of the user.

It is contemplated that the privacy mask or mouthpiece has an inside depth of at least 1 centimeter and not more than 10 centimeters to provide enough free volume for the user's ability to open lips and speak freely.

It is contemplated that the privacy mask links both cheeks of the user up to a fixed point where the skin of the cheek does not move when the user open his or her lips in order to articulate.

It is contemplated that the privacy mask or mouthpiece has an internal volume when applied to a user's mouth below 0.3 liter.

It is contemplated that the thickness of the privacy mask or mouthpiece is at least millimeter and not more than 10 millimeters.

It is contemplated that the privacy mask or mouthpiece has a total weight less than 150 grams, preferably less than 100 grams.

It is contemplated that the privacy mask is either a single and impervious layer of synthetic material or that it is lined with a thin sheet of low density Melamine foam, such as BASF's BASOTECT* or, when quality of sound needs not to be optimal with a paper or cotton felt.

It is contemplated that a protective cover made of fabric or paper is added on top of the Melamine foam to improve comfort for the user's lips.

It is contemplated that the thickness of the Melamine foam layer inside the privacy mask or mouthpiece is at least 1 millimeter and not more than 10 millimeters.

It is contemplated that the Melamine foam or felt layer is not glued to the mask or mouthpiece, hence can be removed and replaced after extensive use to preserve hygiene.

It is contemplated that the Melamine foam has a density below 20 $kg/m^3$, and preferably below 12 $kg/m^3$, with open cells.

It is contemplated that the Melamine foam layer has a butterfly shape to cover the inside curved surface of the privacy mask without wrinkles with a butterfly shape is slightly larger than the inside curved surface of the privacy mask in order to serve as well as a soft brim for better contact with the user's face.

It is contemplated that a hole may be dug in the Melamine foam layer in front of the second opening of the privacy mask connected to the transfer tube.

It is contemplated that the Melamine foam has a chemical composition giving low emission of VOC's (Volatile Organic Compounds).

It is contemplated that the Melamine foam may contain additives, such as antimicrobial agents or flame retardant agents.

It is contemplated that the transfer tube is a single pipe with smooth internal surface, with the proviso that the transfer tube is either made of rigid self-supporting synthetic material or is a flexible pipe inserted in a rigid tube, made of plastic or thin metal, in both cases the transfer tube being able to hold the mask or mouthpiece in position against the user's mouth.

It is contemplated that the privacy mask is held against the user's mouth without need for a strap behind the head since it hangs from the user's headset via the transfer tube.

It is contemplated that the transfer tube is bendable to adjust to the user's face.

It is contemplated that the transfer tube can rotate either through a hinge, or through an axle, located near the earpiece to manually move the mask and the tube away from the user's mouth, when not speaking, and conversely, to easily return the privacy mask to its position around the user's mouth when the user is in need of speaking.

It is contemplated that the transfer tube is connected to a phone or computer receiver at its exit without need for pre-amplification, since the user's voice is concentrated inside the transfer tube.

It is contemplated that the whole privacy device, as it is designed and used, eliminates the need for ANR (Active Noise Reduction) or ENC (Electronic Noise Cancelling) hence reduces manufacturing and operating costs.

It is contemplated that the user of the privacy speaking and hearing device may whisper, or speak with a very low tone, since the privacy mask or mouth-piece concentrates the user's voice sound inside the transfer tube.

It is contemplated that the users of the privacy speaking and hearing device may breath freely through proper openings either in the mask or mouthpiece, or at the end of the outside tube.

It is contemplated that the privacy mask or mouthpiece may be made of synthetic material, such as Nylon* 12 from Du Pont, and may be embedded in a natural cover, such as a thin skin of leather, or a piece of fabric, or a sheet of plastic. Such a sandwich combination improves both aesthetics and sound insulation.

It is contemplated that the headset connected to the privacy mask via the transfer tube, is either a single or double earpiece, preferably it is a double earpiece for better comfort.

It is contemplated that the headset connected to the privacy mask, is an over the head or behind the neck headset. In both cases, the headset can be simple earpieces or over the ear headsets.

It is contemplated that the earpieces contain full size on ear cushions, for instance made of foam, for better comfort and more secure sound insulation.

It is contemplated that the headset connected to the privacy mask via the transfer tube, is a wireless headset.

BRIEF DESCRIPTION OF THE INVENTION

DETAILED DESCRIPTION OF THE INVENTION

The advantages and details of the speaking and hearing communication privacy device will be apparent from the following detailed description of preferred embodiments of the invention.

Figure 1:
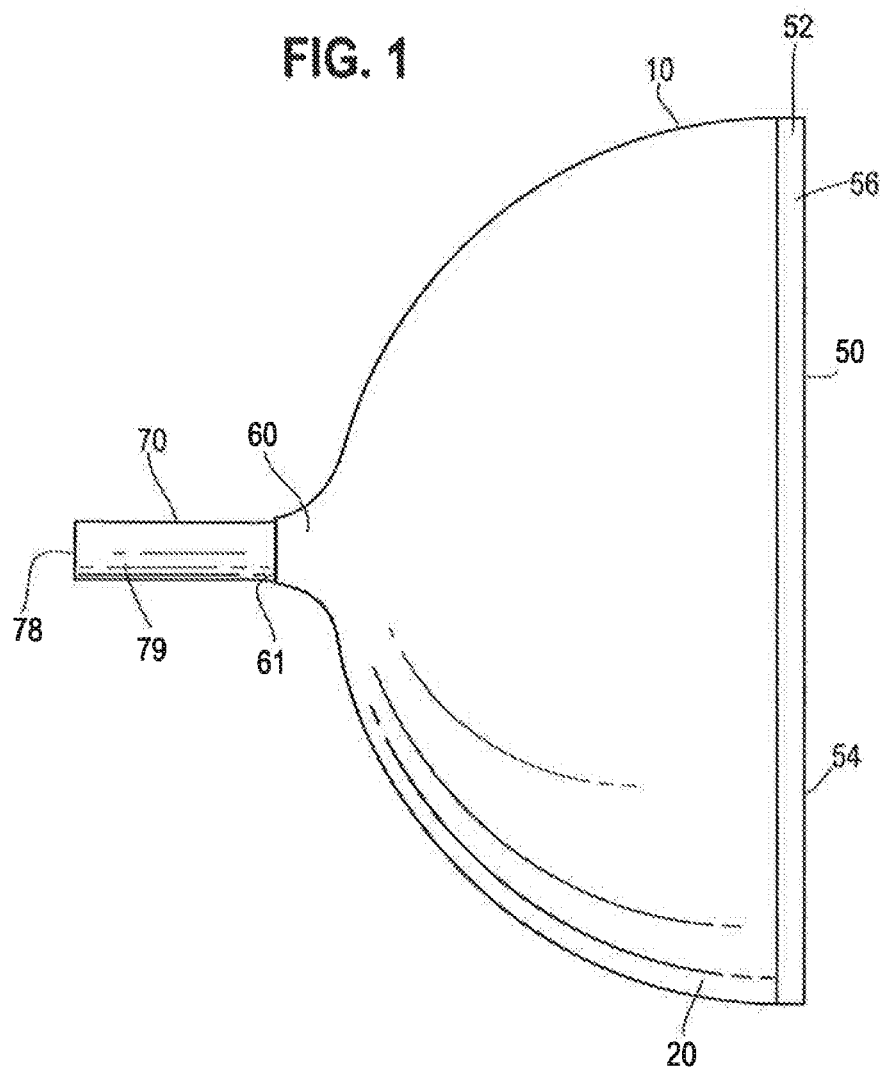
FIG. 1 is a side-view of the privacy mask with the semi-circular mouthpiece

Referring to FIG. 1, the mask 10 has a cup or butterfly shaped privacy mask housing portion 20. The privacy mask has an opening end 50 and exit end 60. The opening end 50 has a facial piece 52 attached to the housing portion at the affixing edge 54 and a brim 56 with a general structure to complement facial groves of the user. The privacy mask-housing portion 20 is suitably made from PE (Polyethylene), transparent plastic, or synthetic material, such as rubber.

The transfer tube 70 has an inner wall and outer wall 79. The transfer tube 70 connects with the mask 10 at joint 61. At the distal end, the transfer tube 70 has an exit 78.

Figure 2:
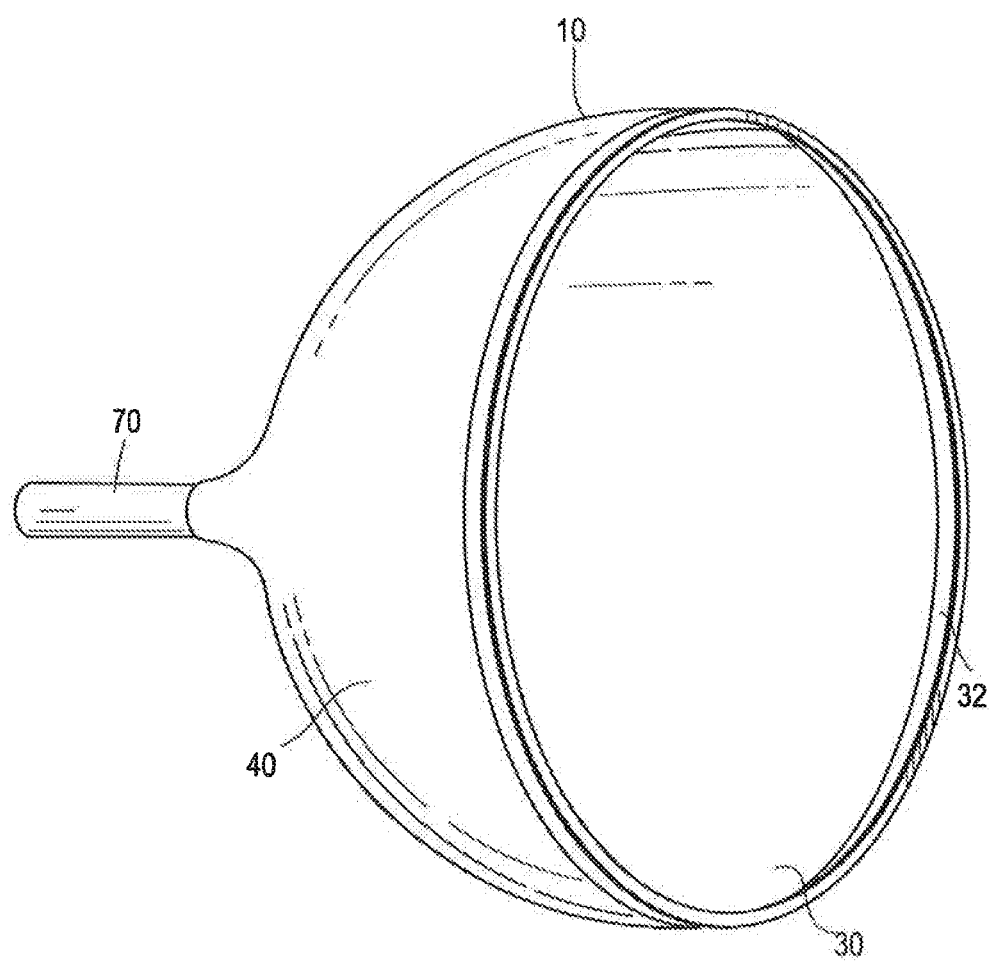
FIG. 2 is an angle front view of the privacy mask and transfer tube.

Referring to FIG. 2, the inner wall 30, with an inner wall 30 and outer wall 40, can be lined with a layer 32 that can be soft foam or heavy material. The inner surface of the privacy mask soft foam or heavy material further comprises synthetic materials, such as rubber, silicone polymer, mineral filled polyolefine, PVC (Polyvinyl Chloride), PC (Polycarbonate), TPU (Thermoplastic Polyurethane elastomer), RIM (Reaction Injection Molding), Polyester, Thermoplastic Polyester, Polyethylene, HDPE (High Density Polyethylene), LDPE (Low Density Polyethylene), Fluorinated HDPE, PP (Polypropylene), PS (Polystyrene), PET (Polyethylene Terephthalate), ABS (Acrylo-Butyro-Styrene), PA (Polyamide), Melamine, or natural products such as wood, cardboard or leather, being rigid, flexible or semi-flexible.

Figure 3:
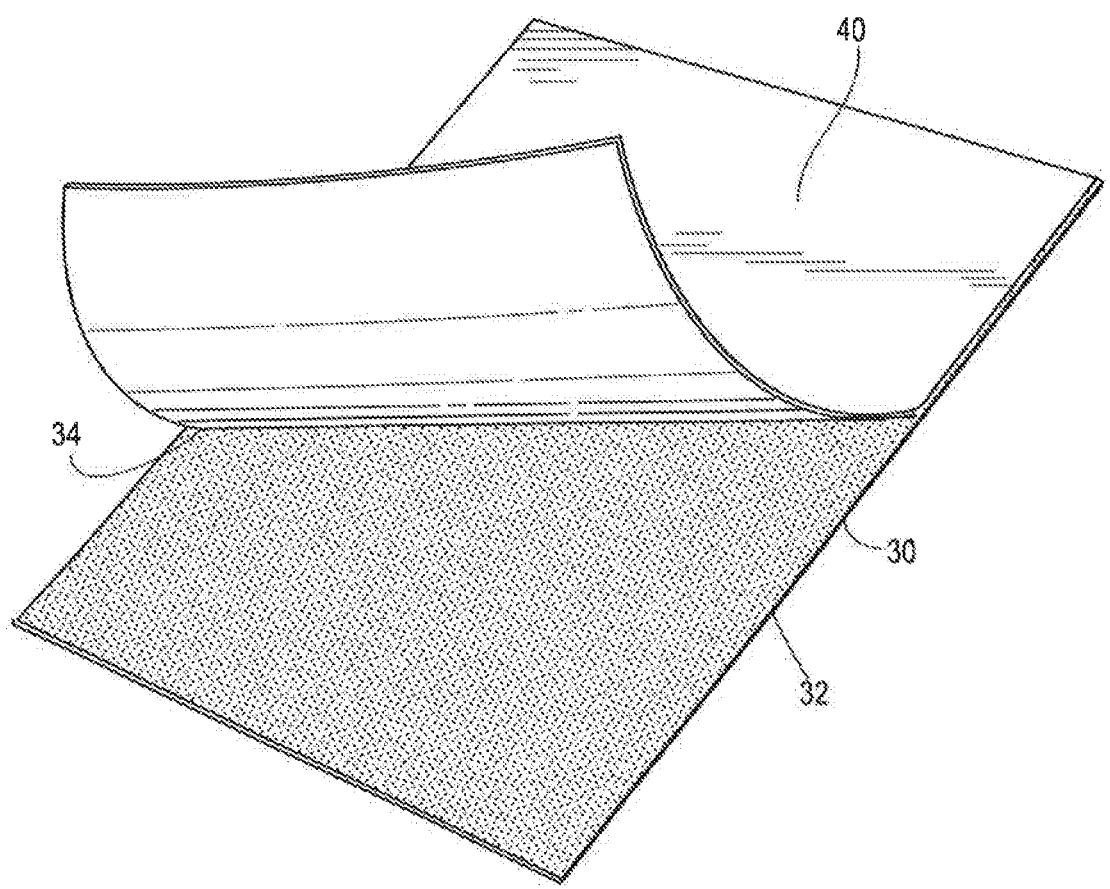
FIG. 3 is a sectional view of the layered form within the privacy mask or transfer tube.

Referring to FIG. 3, the layer 32 and inner wall 30 can be made of synthetic materials, such as rubber, silicone polymer, mineral filled polyolefine, PVC (Polyvinyl Chloride, PC (Polycarbonate, TPU (Thermoplastic Polyurethane elastomer), RIM (reaction Injection Molding), Polyester, Thermoplastic Polyester, Polyethylene, HDPE (High Density Polyethylene), LDPE (Low Density Polyethylene), Flourinated HDPE, PP (Polypropylene), PS (Polystyrene), PET (Polyethylene Terephthalate), ABS (Acrylo-Butyro-Styrene), PA (Polyamide), Malamine, or natural products such as wood, cardboard, or leather. The heavy layer can be rigid, flexible or semi-flexible. It is further contemplated the layer 32 is an acoustical material such as cotton felt, fiber pads, polyurethane based foam, conventional, highly resilient, preferably viscoelatic.

It is contemplated the heavy layer 32, or massback, is made of soft or flexible material, such as synthetic plastic or natural leather, for instance made of TPU's, PVC, PE, silicone, or any type of artificial leather. The minimum weight of this foam or heavy layer is 500 grams/m$^2$.

Referring to FIG. 3, the outer layer 40 and layer of foam 34.

Figure 4:
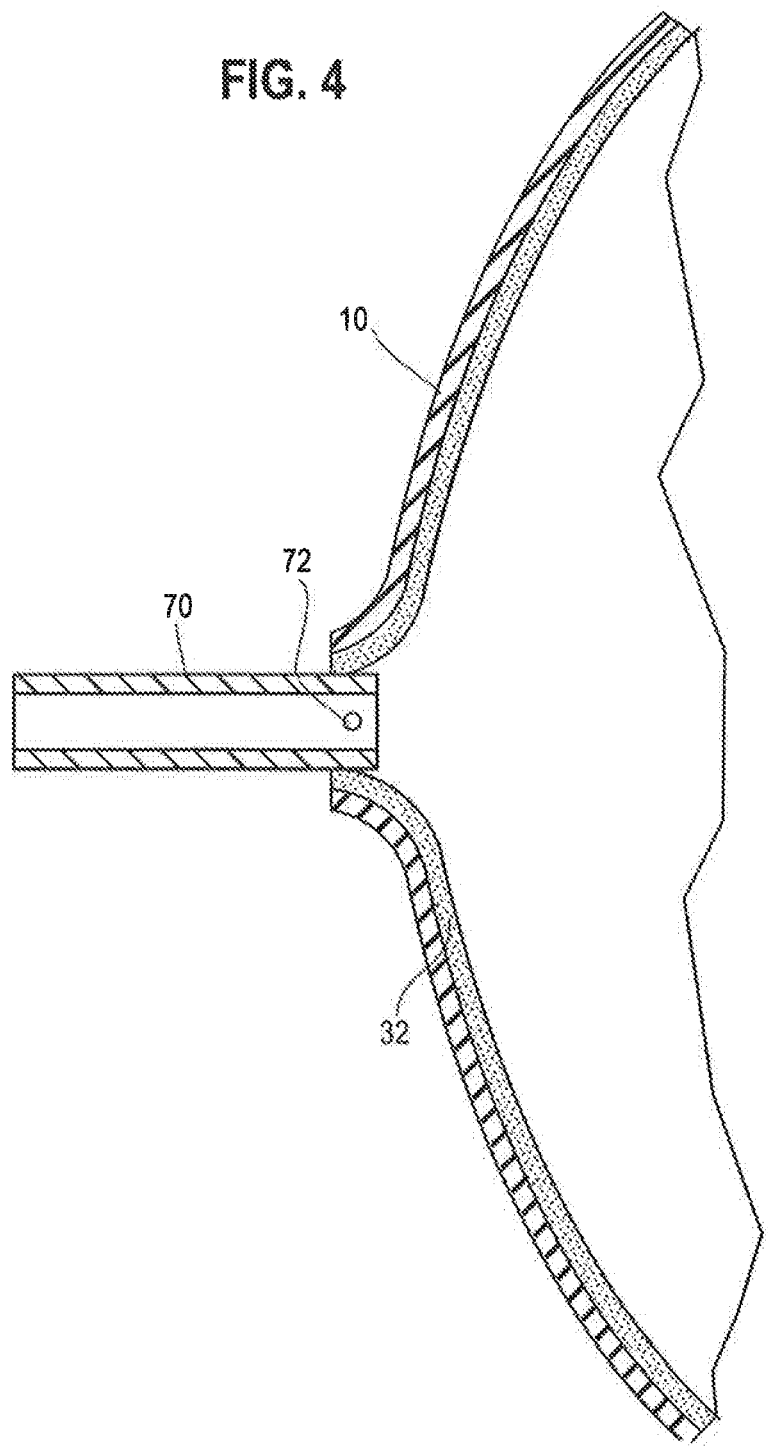
FIG. 4 is a side view of the privacy mask or mouthpiece showing the second opening for the connection to the transfer tube.

Referring to FIG. 4, the transfer tube 70 has an open end 72 at which the privacy mask 10 is connected.

Figure 5:
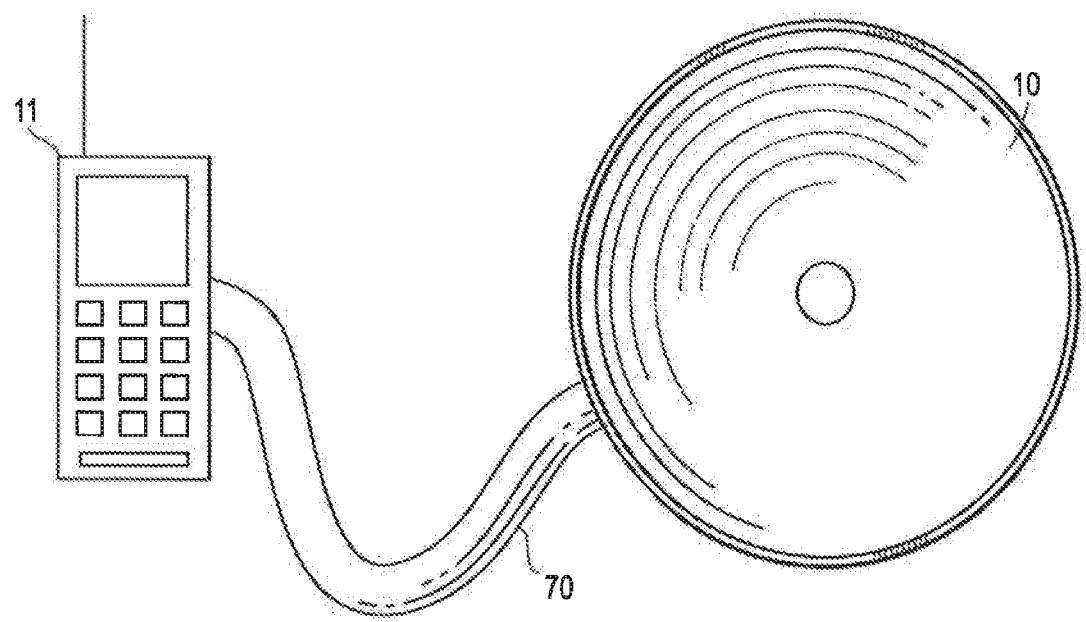
FIG. 5 is a front view of the privacy mask at or near the communication device.

Referring to FIG. 5, the transfer tube 70 distal end is located at or near communication device 11.

Figure 6:
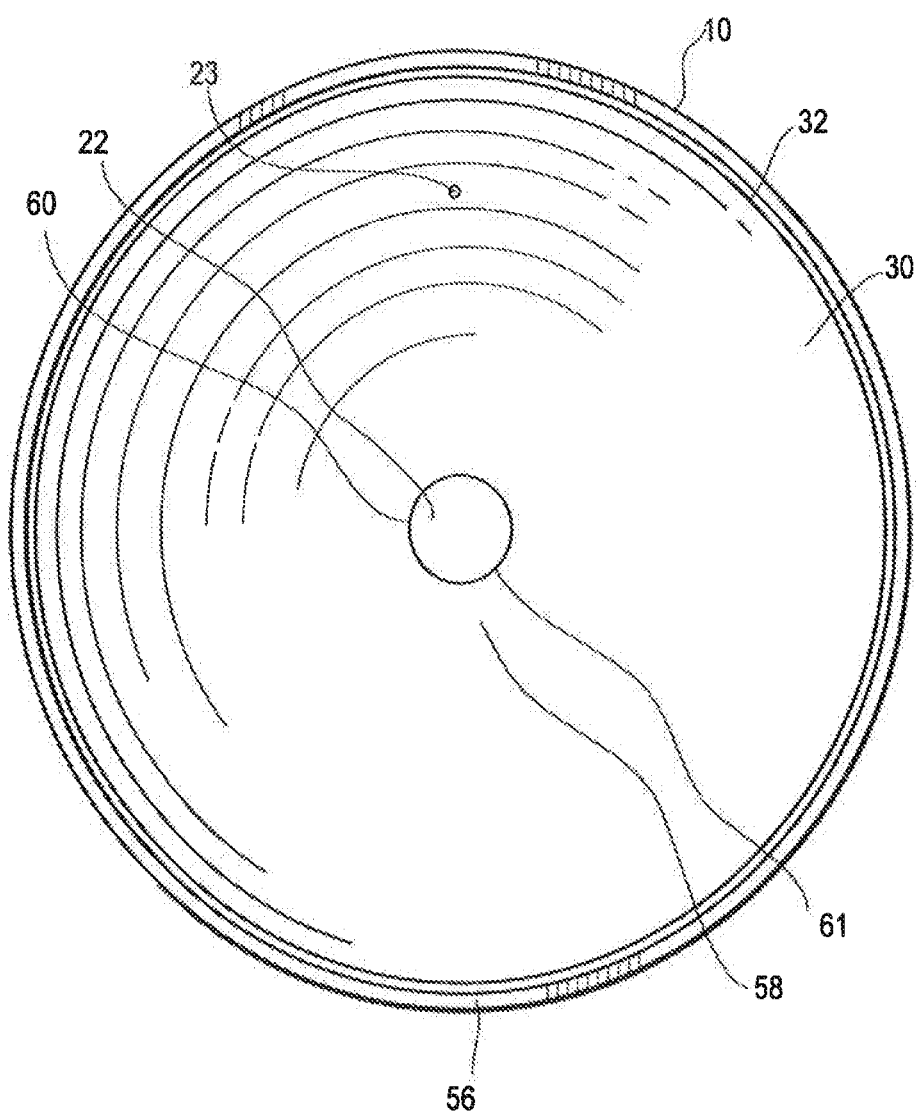
FIG. 6 is a front view of the privacy mask.

Referring to FIG. 6, the transfer tube 70 is connected to the mask 10 through a hole 22, this hole 22 can be placed in front of the speaker's mouth, or it can be placed on a side of the mask 10. Hole 22 is surrounded by the edge 60 of the mask. Preferably the size of the hole 22 in the mask 10 is completely connected with no holes 22. This transfer tube 70 is preferably vertical in relation to the mask surface, but could be at an angle of 45 degrees. The transfer tube 70 does not need to be cylindrical since any shape would work provided the internal surface is smooth to let the sound waves travel inside. Preferably, with the present invention the transfer tube 70 is cylindrical. The transfer tube 70 can be straight or bent to go from the mask 10 to the surface of the sound receiver of an electronic device 1I. The transfer tube 70 has an internal diameter between 0.1 and 2 centimeters, more preferably between 0.3 and 1.5 centimeter. A wider the transfer tube 70 relates to the longer the voice can travel. It is contemplated a transfer tube 70 length of not longer than 100 centimeters is preferable for practical purposes, since a longer tube would be cumbersome to carry around, although it would work, provided the internal surface is smooth to prevent wave filtering.

It is contemplated the device have a filter 58 within the mask 10 to prevent dust accumulation. Further, when the transfer tube 70 has an internal diameter of 5 millimeters, the air turbulence can be heard at the open end 72 of the tube. It is contemplated to resolve this problem that a second breathing hole 23 could be present on the mask 10 surface. When the mask 10 is not applied to the skin of the user, there is enough space left for breathing and there is no need for such second opening in the mask 10.

It is contemplated that a sound receiving device 11 can be placed at or near the exit end 74 of the transfer tube 70. The phone-receiving device 11 can be also located outside at or near the exit end 74 of the transfer tube 70. The exit end 74 of the transfer tube 70 can be open and either be in contact with the sound receiver of an electronic device 11, placed at a close distance, between 0 and 2 centimeters, preferably between 0.1 and 1 centimeters. The sound receiver of an electronic device 11 can be a cellular phone or any recording device. The open exit end 74 edge of the transfer tube 70 can be smooth, jagged, or tapered. The open exit end 74 edge of the transfer tube 70 is open to provide a flow of oxygen for the speaker's breathing. The outside surface 79 of the open exit end 74 and sound receiver of an electronic device, can be covered with a film or a piece of plastic to prevent disturbance with outside noises.

The angle between the transfer tube exit 74 and the surface of the sound receiver of electronic device 80 can vary between 30 and 90 degrees, preferably between 45 and 90 degrees. The exit end 74 of the transfer tube 70 is either straight or with an angle. The transfer tube 70 can be either held in position by the hand of the user or it can attach to the sound receiver of electronic device 80 using proper means, such as a sock, a clip, a rubber band, Velcro, sucking device, or the like. The benefit of the transfer tube 70 connected to the receiving unit includes avoiding parasitical noises. The mask 10 and/or transfer tube 70 can also be fixed to a seat headrest, to a helmet, a hearing or ear protecting device or placed in the interlining of a cloth. In such cases it can be moved by the use of hinges or hanging belts before and after phone call.

It is contemplated that the exit end 74 of the transfer tube 10 is connected to or near a sound receiver of an electronic device 11.

Figure 7:
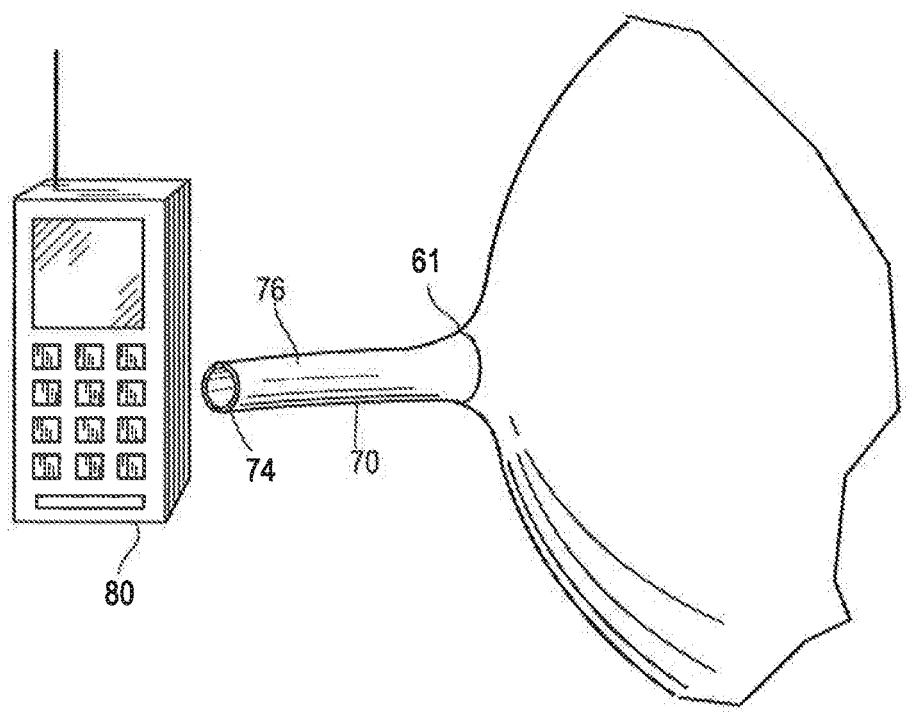
FIG. 7 is a side view of the privacy mask at or near the communication device.

Referring to FIG. 7, the minimum length of the transfer tube 70, from the mask 10 to the surface of the sound receiver of an electronic device 80 (also 11) is at least 2 centimeters, preferably more than 6 centimeters, and more preferably between 8 and 50 centimeters. The internal diameter should not vary but more than 20% from the open end 72 of the transfer tube 70 to the exit end 74, based on the nominal diameter, provided the internal section is not changed by more than 50%. Such variations are foreseeable when the user bends the transfer tube 70 and its circular section becomes an oval. The transfer tube 70 can also be telescopic for easier transportation or could be foldable.

The transfer tube 70 itself can be rigid or flexible with a thickness is at least 0.1 centimeter, and no greater than 1 centimeter.

The device provides comfort and the mask 10 is wide enough for the user to prevent blocking of the user's jaw.

The privacy mask 10 with a semi-circular mouthpiece having an exemplary length 30 of 9 centimeters, a semi-circular depth on the speaking side 31 of 3 centimeters, an inside depth 32 of 2 centimeters, a second hole 34 with a total with of 1 centimeter, a length 33 of 1 centimeter.

The privacy mask with a total width for the mouthpiece 39 of 4 centimeters, and a thickness 37 for the privacy mask of 0.2 centimeter, hence an internal width for the user's mouth of 3.6 centimeters; a second hole 35 for connection to the transfer tube with an internal diameter of 0.6 centimeter.

Such an exemplary privacy mask is made with a 3D printer, using Nylon 12 as the synthetic material. With such a semi-circular mouthpiece, this privacy mask is able to link the user's cheeks and to provide enough free space for the user's lips to open, when speaking.

Such an exemplary privacy mask was equipped with a transfer tube 70 made of PE (polyethylene) having an external diameter of 0.5 centimeter, a 0.1-centimeter thickness layer of adhesive tape to made joint with the privacy mask, an internal diameter of 0.3 centimeter and a total length of 50 centimeters. The voice sound is perfectly transmitted through this distance when user whispers inside the privacy mask, hence are able to activate the sound receiver of a phone with little disturbance to the environment.

The exit opening 74 on the transfer tube 70 shape can be round, square, oval, or the like.

Figure 8:
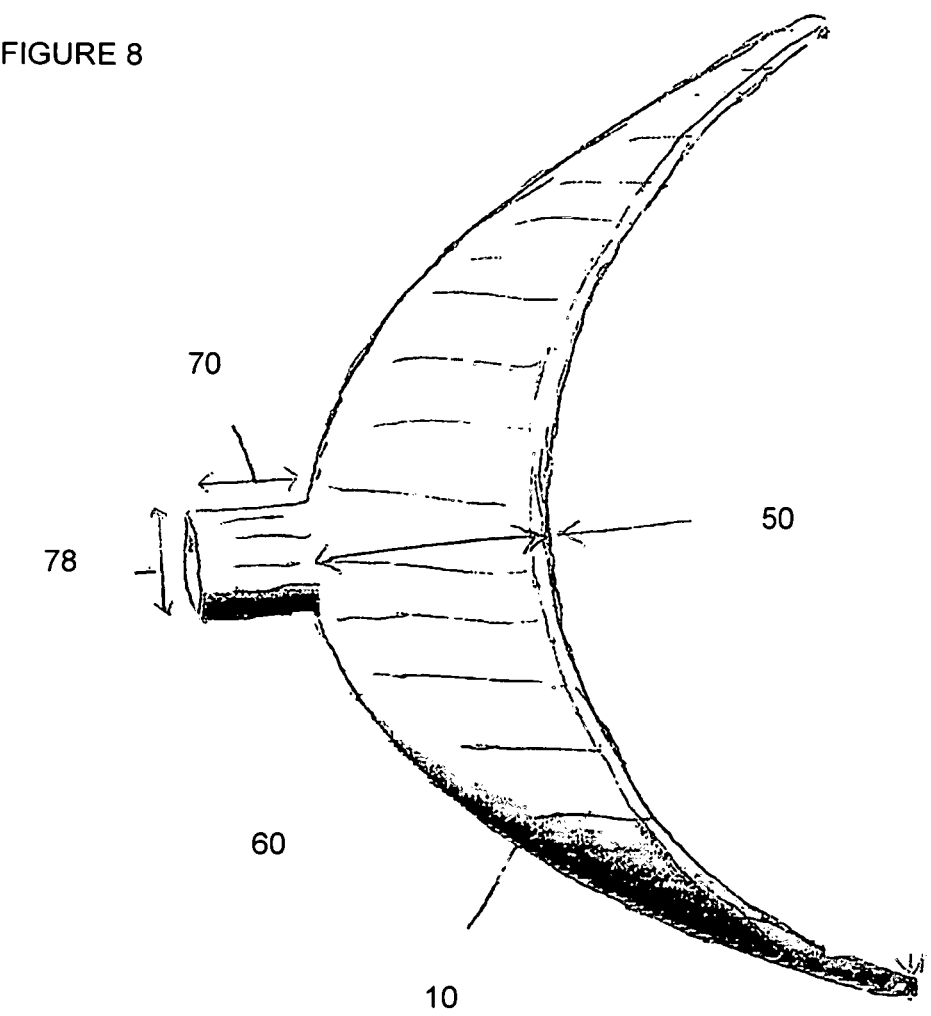
FIG. 8 is a side view of the butterfly shaped privacy mask.

Referring to FIG. 8, the privacy ask 10 can be hyhperbola in shape.

The invention claimed is:

1. A Communication privacy device, comprising:
   a cup-shaped mask having an inner wall surface, and outer wall surface with an opening end for positioning on a user's face and over the user's mouth and facial piece;
   the inner wall surface is lined with a soft foam or heavy material layer, or both;
   the opening end has a facial piece attached to the housing portion at the affixing edge and a brim covered with flexible foam with a general structure to complement facial groves of the user;
   a transfer tube having an open end connected to the mask at the closed end;
   the transfer tube is connected to the mask through a hole;
   the hole can be placed in front of the speaker's mouth, or on a side of the mask;
   the transfer tube, not longer than 100 centimeters, is an elongated tube, rigid or flexible, with an open end, middle section, and exit end, and an inner and outer surface;
   the inner surface of the transfer tube is smooth;
   the transfer tube having an open end orientated directly at said user's mouth in said opening;
   the transfer tube exit end is straight, jagged, or tapered;
   a sound receiver of an electronic device, being a cellular phone or any recording device, is placed at a close distance having an angle to the exit end, the exit end is round, square, or oval, of the transfer tube;
   the transfer tube has an inner wall diameter between 0.1 and 2 centimeter;
   the total weight is no more than 500 grams.

2. The communication privacy device of claim 1, wherein the privacy mask housing portion is made from PE (Polyethylene), transparent plastic, or synthetic material, such as rubber.

3. The communication privacy device of claim 1, wherein the inner surface of the privacy mask soft foam or heavy material further comprises synthetic materials, such as rubber, silicone polymer, mineral filled polyolefine, PVC (Polyvinyl Chloride), PC (Polycarbonate), TPU (Thermoplastic Polyurethane elastomer), RIM (Reaction Injection Molding), Polyester, Thermoplastic Polyester, Polyethylene, HDPE (High Density Polyethylene), LDPE (Low Density Polyethylene), Fluorinated HDPE, PP (Polypropylene), PS (Polystyrene), PET (Polyethylene Terephthalate), ABS (Acrylo-Butyro-Styrene), PA (Polyamide), or natural products such as wood, cardboard or leather, being rigid, flexible or semi-flexible.

4. The communication privacy device of claim 3, wherein the device is fixed to a seat headrest, helmet, hearing protecting device, or in the interlining of clothes.

5. The communication privacy device of claim 3, wherein foam or heavy layer does not contain products that cause allergies such as Chromium, Nickel, Mercury or Cobalt are not used in case of leather use, DBT (Dibutyl) or TBT (Tetrabutyl) Tin are less than 0.1 milligram par kilog of foam, TDA (Toluene diamine) or MDA (Methyldiphenylamine) are less than 5 milligram per kilogram of foam, Phatalate limits that are less than 100 milligram per kilogram.

6. The communication privacy device of claim 3, wherein the foam has a thickness between 2 and 20 mm and a density below 15 kg/m3 and above 15 kg/m2.

7. The communication privacy device of claim 3, wherein the foams or heavy layer include polyurethane foams, and do not contain heavy metals, Phthalate plasticizers, Organo tin compounds, TDA (Toluene Diamine), MDA (Methyl Diphenyl Amine), and amine catalysts compounds, and have low Chlorine levels.

8. The communication privacy device of claim 3, where the foams or heavy layer contain polyols, and additives, such as a IJV stabilizers, biocides, fungicides, bactericides, PIPA (Polyisocyanate Polyaddition polyols) or PHD (Polyharnstoff or Polyurea) polyols, and other flame resistant chemicals.

9. The communication privacy device of claim 3, where the mask is shaped as an elongated cup with a semi-circular mouthpiece for positioning over a user's mouth from cheek to cheek and a second opening;
the transfer tube having an open end connected to the privacy mask at its close end through the second hole;
the transfer tube open end being placed at close distance of a sound receiver located in a headset equipped with earpieces;
and the device being connected to an electronic device, being a phone or a computer.

10. The communication privacy device of claim 3, where the mask inner wall surface of the privacy mask is lined with a soft foam with open cells made of Melamine.

11. The communication privacy device of claim 10, where the Melamine foam layer has a butterfly shape to cover the inside curved surface of the privacy mask without wrinkles with a butterfly shape is slightly larger than the inside curved surface of the privacy mask in order to serve as well as a soft brim for better contact with the user's face.

12. The communication privacy device of claim 3, where the mask has a total weight between 120 grams and 100 grams.

13. The communication privacy device of claim 12, where the thickness of the Melamine foam layer inside the privacy mask or mouthpiece is at least 1 millimeter and not more than 10 millimeter.

14. The communication privacy device of claim 3, where the transfer tube is bendable, can rotate through a hinge, or an axle located near the supporting earpiece.

15. The communication privacy device of claim 3, where the privacy mask is either a single and impervious layer of synthetic material or that it is lined with a thin sheet of low density Melamine foam, such as BASOTECT.

16. The communication privacy device of claim 1, wherein the exit end of the transfer tube can be open and either be in contact with the sound receiver of an electronic device, placed at a close distance, between 0 and 2 centimeters, preferably between 0.1 and 1 centimeter.

17. The communication privacy device of claim 1, wherein the angle between the transfer tube exit and the surface of the sound receiver of electronic device can vary between 30 and 90 degrees, preferably between 45 and 90 degrees held in position by the hand of the user or it can attached to the sound receiver of electronic device using proper means, such as a sock, a clip, a rubber band, Velcro, sucking device, or the like.

* * * * *

UNITED STATES PATENT AND TRADEMARK OFFICE
CERTIFICATE OF CORRECTION

| | | |
|---|---|---|
| PATENT NO. | : 11,778,357 B2 | Page 1 of 1 |
| APPLICATION NO. | : 16/038403 | |
| DATED | : October 3, 2023 | |
| INVENTOR(S) | : Nicolas Casati et al. | |

It is certified that error appears in the above-identified patent and that said Letters Patent is hereby corrected as shown below:

In the Specification

Column 4, Line 37, change "Aurical 48®" to ---Amical 48®---.

Signed and Sealed this
Twenty-eighth Day of November, 2023

*Katherine Kelly Vidal*
*Director of the United States Patent and Trademark Office*